United States Patent [19]
Scott

[11] 4,084,248
[45] Apr. 11, 1978

[54] METHOD AND APPARATUS FOR ERROR CORRECTION

[75] Inventor: Larkin B. Scott, Fort Worth, Tex.

[73] Assignee: The Perkin-Elmer Corporation, Norwalk, Conn.

[21] Appl. No.: 763,042

[22] Filed: Jan. 31, 1977

Related U.S. Application Data

[63] Continuation of Ser. No. 654,704, Feb. 2, 1976.

[51] Int. Cl.² .............................................. G01J 3/42
[52] U.S. Cl. .................................... 364/571; 364/525; 356/97; 73/1 R
[58] Field of Search ...................... 235/151.35, 151.3; 356/96, 97; 73/190 R, 1 R; 364/200

[56] References Cited

U.S. PATENT DOCUMENTS

| | | | |
|---|---|---|---|
| 3,634,868 | 1/1972 | Pelavin et al. ..................... 73/1 R X |
| 3,641,444 | 2/1972 | Watts ............................. 73/190 R X |
| 3,646,331 | 2/1972 | Lord ................................. 356/96 X |
| 3,681,577 | 8/1972 | Gasiunas ........................... 73/1 R X |
| 3,695,764 | 10/1972 | Delmas et al. ............... 235/151.35 X |
| 3,734,621 | 5/1973 | Moody et al. ...................... 356/97 X |
| 3,886,331 | 5/1975 | Schierer, Jr. ....................... 356/96 X |
| 3,935,436 | 1/1976 | Holschlag ...................... 235/151.35 |
| 3,986,776 | 10/1976 | George ............................... 356/96 X |
| 4,013,364 | 3/1977 | Nakano et al. ..................... 356/96 X |

*Primary Examiner*—Edward J. Wise
*Attorney, Agent, or Firm*—F. L. Masselle

[57] ABSTRACT

In a device in which an independent variable is stepped or scanned between a first limit and second limit and in which device there is an error which is a function of the independent variable, error correction is obtained by storing correction values, preferably of an incremental nature, for each of a plurality of steps of the independent variable, establishing a location marker which can be identified as different from the error correction data, moving the location marker so as to always be adjacent the error correction for the current position or step of the independent variable and reading out the error correction at the point of the location marker.

27 Claims, 24 Drawing Figures

| | 21b | | | | 21a | | | | | | | |
|---|---|---|---|---|---|---|---|---|---|---|---|---|
| | A | B | C | D | E | F | G | H | I | J | K | L |
| | 1 | 0 | 1 | 0 | 0 | 0 | 0 | 1 | 1 | 1 | 1 | 0 |
| | 1 | 0 | 0 | 0 | 1 | 1 | 0 | 0 | 1 | 1 | 0 | 0 |
| | A' | B' | C' | D' | E' | F' | G' | H' | I' | J' | K' | L' |

*FIG. 2d*

| | 21b | | | | 21a | | | | | | | |
|---|---|---|---|---|---|---|---|---|---|---|---|---|
| | A | B | C | D | E | F | G | H | I | J | K | L |
| | 1 | 1 | 0 | 0 | 0 | 0 | 0 | 1 | 1 | 1 | 1 | 0 |
| | 1 | 0 | 0 | 1 | 1 | 1 | 0 | 0 | 1 | 1 | 0 | 0 |
| | A' | B' | C' | D' | E' | F' | G' | H' | I' | J' | K' | L' |

*FIG. 2e*

| | 21b | | | | 21a | | | | | | | |
|---|---|---|---|---|---|---|---|---|---|---|---|---|
| | A | B | C | D | E | F | G | H | I | J | K | L |
| | 1 | X | X | X | X | X | X | X | X | X | X | X |
| | 1 | X | X | X | X | X | X | X | X | X | X | X |
| | A' | B' | C' | D' | E' | F' | G' | H' | I' | J' | K' | L' |

| | 21b | | | | 21a | | | | | | | |
|---|---|---|---|---|---|---|---|---|---|---|---|---|
| | A | B | C | D | E | F | G | H | I | J | K | L |
| | 1 | 1 | 1 | 1 | 0 | 1 | 0 | 0 | 0 | 0 | 1 | 1 |
| | 1 | 1 | 1 | 0 | 0 | 0 | 0 | 1 | 1 | 0 | 0 | 1 |
| | A' | B' | C' | D' | E' | F' | G' | H' | I' | J' | K' | L' |

FIG. 2l

| | 21b | | | | 21a | | | | | | | |
|---|---|---|---|---|---|---|---|---|---|---|---|---|
| | A | B | C | D | E | F | G | H | I | J | K | L |
| | 1 | 1 | 0 | 1 | 0 | 1 | 0 | 0 | 0 | 0 | 1 | 1 |
| | 1 | 1 | 0 | 1 | 0 | 0 | 0 | 1 | 1 | 0 | 0 | 1 |
| | A' | B' | C' | D' | E' | F' | G' | H' | I' | J' | K' | L' |

FIG. 2m

| | 21b | | | | 21a | | | | | | | |
|---|---|---|---|---|---|---|---|---|---|---|---|---|
| | A | B | C | D | E | F | G | H | I | J | K | L |
| | 1 | 1 | 0 | 0 | 1 | 1 | 0 | 0 | 0 | 0 | 1 | 1 |
| | 1 | 1 | 0 | 0 | 0 | 1 | 0 | 1 | 1 | 0 | 0 | 1 |
| | A' | B' | C' | D' | E' | F' | G' | H' | I' | J' | K' | L' |

|   | 21b |   |   |   | 21a |   |   |   |   |   |   |   |
|---|---|---|---|---|---|---|---|---|---|---|---|---|
|   | A | B | C | D | E | F | G | H | I | J | K | L |
|   | 1 | 1 | 0 | 0 | 1 | 1 | 0 | 0 | 0 | 0 | 1 | 1 |
|   | 1 | 1 | 0 | 0 | 1 | 0 | 0 | 1 | 1 | 0 | 0 | 1 |
|   | A' | B' | C' | D' | E' | F' | G' | H' | I' | J' | K' | L' |

*FIG. 2n*

|   | 21b |   |   |   | 21a |   |   |   |   |   |   |   |
|---|---|---|---|---|---|---|---|---|---|---|---|---|
|   | A | B | C | D | E | F | G | H | I | J | K | L |
|   | 1 | 1 | 0 | 1 | 0 | 1 | 0 | 0 | 0 | 0 | 1 | 1 |
|   | 1 | 1 | 0 | 1 | 0 | 0 | 0 | 1 | 1 | 0 | 0 | 1 |
|   | A' | B' | C' | D' | E' | F' | G' | H' | I' | J' | K' | L' |

*FIG. 2o*

|   | 21b |   |   |   | 21a |   |   |   |   |   |   |   |
|---|---|---|---|---|---|---|---|---|---|---|---|---|
|   | A | B | C | D | E | F | G | H | I | J | K | L |
|   | 1 | 1 | 1 | 0 | 0 | 1 | 0 | 0 | 0 | 0 | 1 | 1 |
|   | 1 | 1 | 1 | 0 | 0 | 0 | 0 | 1 | 1 | 0 | 0 | 1 |
|   | A' | B' | C' | D' | E' | F' | G' | H' | I' | J' | K' | L' |

*FIG. 2p*

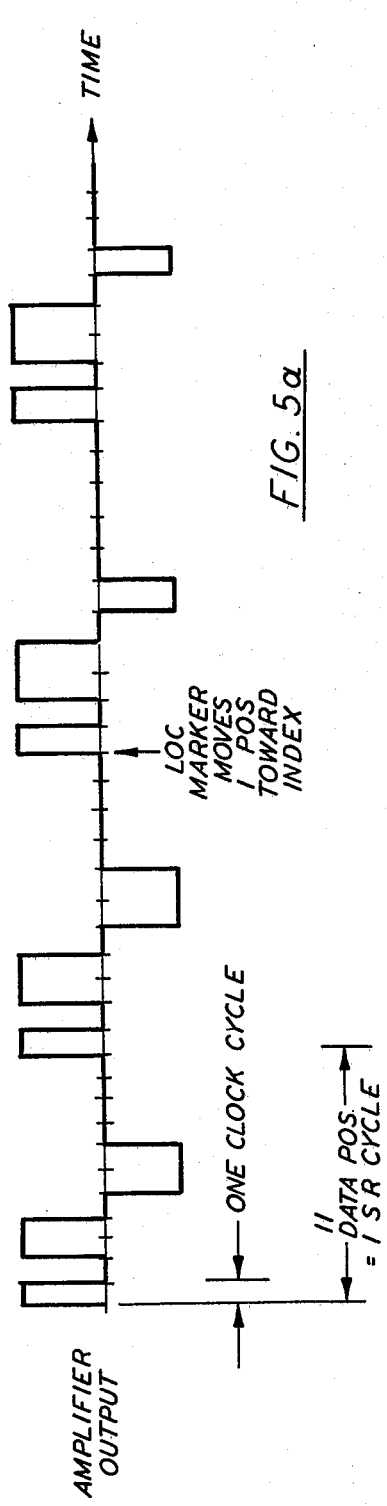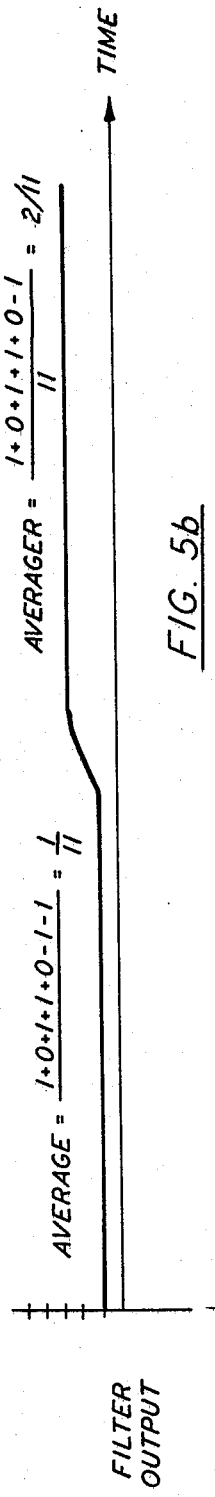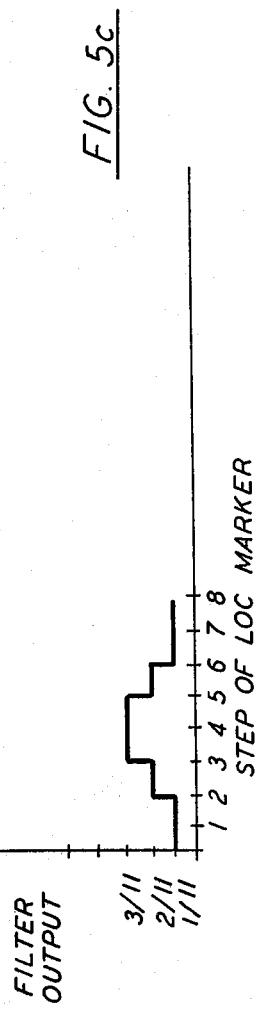
FIG. 5a
FIG. 5b
FIG. 5c

METHOD AND APPARATUS FOR ERROR CORRECTION

RELATED APPLICATIONS

This application is a continuation of application Ser. No. 654,704 filed Feb. 2, 1976.

BACKGROUND OF THE INVENTION

This invention relates to a method and apparatus for correcting an error which is a function of an independent variable such as errors in analytic instruments in general and more particularly to an improved system for obtaining error correction in simple fashion with a minimum of hardware.

Various types of analytic instruments have a base line which varies with a change in an independent variable. Furthermore, certain instruments have errors which change not only as a function of the independent variable but which also change over periods of time, with temperature, etc. This is a particular problem in instruments such as dual beam spectrophotometers. It is also a problem in scanning calorimeters. In the first case, an output signal error must be corrected synchronously with changes in wavelength. In the second case, corrections must be made to the output as the independent variable of temperature changes. In order to gain a better understanding of the present invention it will be disclosed in terms of a dual beam spectrophotometer. It will be understood by those skilled in the art that it may be as easily used with any type of instrument or device in which an error which is a function of an independent variable occurs.

In a dual beam spectrophotometer the concentrations of various constituents in sample substances are determined. To accomplish this two radiation beams from a single source are sequentially directed to a photo-electric detector. One of the beams, whose signal is designated I, passes through the sample. The other signal, designated $I_0$ does not pass through the sample but provides a reference. The I beam which is passed through the sample experiences a decrease in intensity due to absorption by the constituent in proportion to its concentration in the sample. Ideally, except for the absorption by the sample, the I and $I_0$ beam have equal intensity throughout their transmission paths. This is commonly expressed as a ratio $I/I_0 = 100\%$. However, the paths never include exactly the same optical elements since it is impossible to exactly match the reflectivity of the uncommon elements for all wavelengths of the source. In a spectrophotometer wavelengths are scanned in increments, the instrument stepping through the various wavelengths. There are variations in the transmission at each of these wavelengths. Without a correction, the base line, i.e., the zero line from which intensity is measured, is not flat and erronous results are obtained. This is a problem which has been recognized in the art and is referred to as a base line flattening problem. Various attempts have been made to solve this problem through the use of cams, tapped potentiometers or even through the use of the magnetic tape as a medium for storing an $I_0$ correction factor which varies in synchronizm with changes in wavelength. The cam and tapped potentiometer methods are tedious to adjust and force the user to accept predetermined inflection points not too closely spaced with respect to wavelength function. The magnetic tape method is capable of automaticlly finding or adjusting the correction function and has no restriction on the occurrence of inflection points. However, it is an expensive method in view of the requirements for synchronizing the tape drive to the wavelength drive in the instrument.

Thus, there is a need for an improved base line flattening system for use in spectrophotometers, calorimeters and other similar instruments which is simple, inexpensive and does not require extensive adjustment.

In more general terms, there is a need for a simple system for correcting errors in any device where the error is a function of an independent variable in the device.

SUMMARY OF THE INVENTION

The present invention provides a solution of this problem. In general terms, in a device in which an independent variable is stepped or scanned between a first limit and second limit and in which device there is an error which is a function of the independent variable, the present invention provides a manner of correcting that error by storing correction values for each of a plurality discrete steps of the independent variable, establishing a location marker which can be identified as different from the error correction data and by moving the location marker so that it is always adjacent the error correction for the current position or current step of the independent variable. The data adjacent the location marker is then read out to provide the correction.

Preferably, the data is stored in digital form in a shift register or similar device with the bit pattern of the location marker different than any data bit pattern corresponding to an error correction value.

In the preferred embodiment illustrated, in addition to the location marker, an index marker having a pattern different from the location marker and also different from any data pattern is also provided. The location marker, at one end or one limit is placed one data position away from the index marker and is moved further away from the index marker as the independent variable is stepped toward the second limit and toward the index marker when the indepenedent variable is stepped in a direction from the second limit toward the first limit.

In order to attain the maximum amount of correction with the minimum of amount of hardware, preferably only incremental changes in error are stored. This permits two bits to comprise each storage position or location with a "1 0" indicating a change in the positive direction, a "0 1" an incremental change in the opposite direction and a "0 0" indicating no change. This also permits establishing a location marker as the bit pattern "1 1" and the index marker as a bit pattern "1 1, 1 1" taking up two storage positions. A storage position is defined as the number of bits necessary to store the correction for one step of the independent variable. It will recognize that, although only two bits are used in the embodiment described herein, as many bits as are felt necessary to give the desired accuracy may be used. Also, the incremental scheme of the present invention is not an absolute necessity; an absolute error could be stored at each position.

However, using the incremental scheme along with the index marker and location marker permits a particularly efficient digital to analog conversion to be carried out. In the preferred embodiment, two shift registers operating in parallel and synchronized are utilized. Corresponding bit locations in the two shift registers make up the data storage positions of two bits each. The shift registers are both circulating shift registers and are continuously clocked at a rate much higher than the stepping rate of the independent variable. The digital to analog conversion is carried out by providing as an output, through a low pass filter, all of the data between the index marker and location marker for each cycle of the shift register. The filter will thus output a DC value which is the average of the values at its input between the index and location marker. Because the changes are incremental, this output represents the proper correction for the position of the location marker which, in turn, corresponds to the location of the independent variable since it is moved backward and forward therewith. This avoids the need for a counter or register and a separate digital to analog converter in order to get the analog correction data.

In order to permit continuous circulation of the data in the shift register at a high rate in a single direction, shifting of the location marker with steps of the independent variable is carried out by having the data next to the location marker jump over the location marker for each step in the forward direction i.e., in a direction going from the first to the second limit, and having the location marker jump over the data right in front of it when going in the opposite direction.

Since the system of the present invention will normally be implemented with hardware having a volatile memory, means must be provided to recalibrate each time the device is started up. Such means are also included and preferrably include a closed loop about the device to be corrected along with appropriate input circuits to insert data into the data locations as the device is stepped through a range of its independent variable. The range over which it is calibrated may be the full range of the device or only a portion thereof. Thus, the first and second limits mentioned above refer to the limits over which the device is calibrated or over which data is stored and do not necessarily represent the upper and lower end limits of the device. In such a case, where calibration is carried out over other than the full range of the device, the possibility exists that the device could be operated below the calibrated range. Means are provided to prevent loss of synchronism in such a case. The system includes means to detect when the system is about to go below the calibrated range and to cause the direction of movement of the location marker to change. Thus, the location marker which was moving toward the index marker then begins to move away from it. When the direction of the independent variable is again reversed the location marker is caused to move toward the index marker again and, when it becomes directly adjacent thereto, the direction is again changed to restore normal operation.

An input scheme is used in which an integrator integrates the error until it reaches a magnitude which corresponds to the weight given to a single bit in the storage register. At that point the bit is encoded and the integrator reset. Although, the present invention is shown as having an analog input and analog output, the same techniques can be used where the input and/or output are digital. It will be recognized by those skilled in the art that digital integration and comparison can be carried in similar fashion to analog integration and comparison. Furthermore, with respect to the output, although it lends itself particularly well to a digital to analog averaging technique it can also be applied digitally. For example in a digital system a simple manner of using this technique would be to add an analog to digital converter to the output to make maximum use of the analog averaging which the present invention obtains. Furthermore, although the output is shown as being an average output utilizing a low pass filter, it will be recognized that the same result can be accomplished utilizing an integrator at the output along with a sample and hold circuit, with the integrator reset each time the location marker is passed and after the data has been transferred to the sample and hold circuit. This still makes use of the beneficial effects of the present invention in which only incremental changes need be stored and those changes then read out between the index marker and location marker to obtain an average or integrated value corresponding to the position of the location marker and thus the position of the independent variable.

The present invention is particularly applicable to analytic instruments such as dual beam spectrophotometers, scanning calorimeters and the like. The detailed description deals specifically with a device of this nature. However, from the discussion about it it should be evident that the method and apparatus of the present invention can be applied in many areas. In terms of a device such as the spectrophotometer the independent variable is the wavelength and the error which requires correction is an error which results from the ratio of $I/I_0$ not being equal to 100%.

BRIEF DESCRIPTION OF THE DRAWINGS

FIGS. 5a, 5b and 5c are waveform diagrams representing the output of the system.

DETAILED DESCRIPTION OF THE INVENTION

Figure 1:
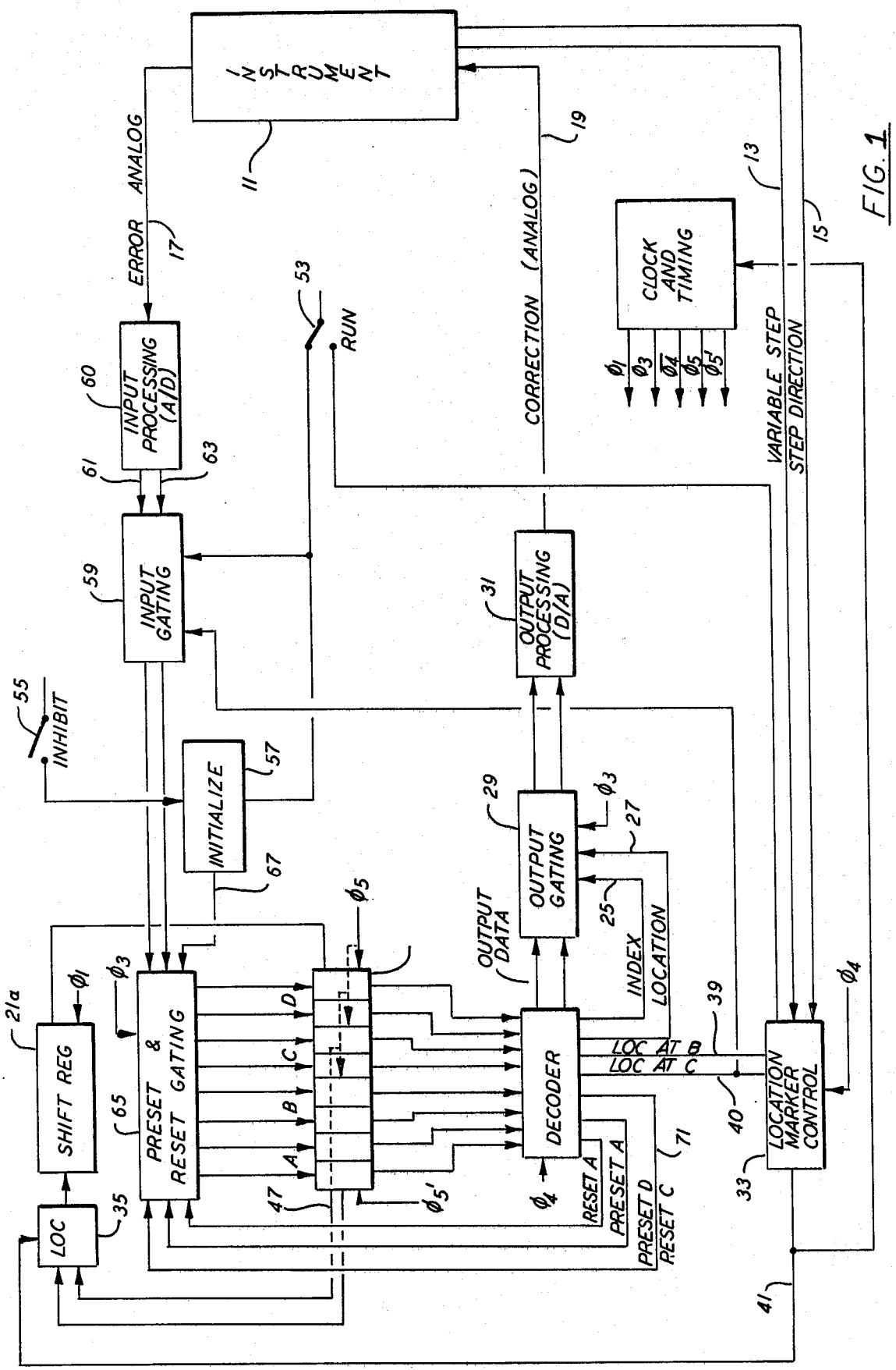
FIG. 1 is an overall block diagram of the system of the present invention.

FIG. 1 is a block diagram of one embodiment of the present invention. Shown is an instrument 11 which will be assumed, for the purposes of this disclosure, to be a spectrophotometer. As pointed out above, the present invention is equally applicable to other instruments and devices. In general terms, in any case where an independent variable is scanned or stepped and the device exhibits an error characteristic which is a function of the independent variable, the present invention may be used.

As is well known by those skilled in the art, a scanning spectrophotometer may include a stepper motor which steps a grating to cause a range of wavelengths to be scanned. In a dual beam spectrophotometer the beam is directed over two separate optical paths into one of which is interposed the sample to be analyzed. The other paty is free and gives a reference value of intensity. The measured intensity is designated I and the reference intensity $I_0$. Ideally, with no sample in the path, the intensity of the two beams as detected at a detector should be equal. However, because the optics cannot be perfectly matched there will be an error which is dependant upon the independent variable wavelength, i.e., the optics respond differently at different wavelengths. The stepper motor for stepping through the various wavelengths is supplied with pulses indicating the occurrence of a step and a signal indicating the step direction. For use in the present system, these signals are picked off the instrument on lines 13 and 15 respectively. The instrument will also include a photoelectric detector and additional circuitry, some of which will be shown in more detail below, from which an analog signal proportional to the ratio $I/I_0$ can be obtained. As indicated above, with no sample it should be one. Means are included to develop a signal indicating the deviation of this ratio from one, i.e. the base line error. This siganl is shown as being taken off the instrument on line 17. In addition, provisions are made in the instrument to add an analog correction signal to the output of the detector. This signal is provided to the instrument on line 19.

The embodiment of the invention shown on FIG. 1 is basically capable of operating in three different modes. These include a calibrate mode, a re-calibrate mode and a run mode. Since implementations of the invention which do not require the calibrate mode are possible, the operation of the present invention in the run mode will first be described. For this purpose, it wll be assumed that the necessary correction for each step of the independent variable in the instrument 11 is known. These corrections are stored in a circulating shift register including a portion 21a and a portion 21b. Each set of correction data for a step of the instrument is assigned a predetermined number of bits positions in the shift register, hereinafter sometimes referred to as date storage positions or locations. In the example shown, each storage position will be assumed to include two bits. As will be more fully explained below, the present embodiment operates in an incremental manner so that one bit of the two bits per storage location represents a positive increment and the other bit a negative increment. Naturally, if desired, each storage position may include more bits. Also stored in the circulating shift register is an index marker and a location marker. Both the index marker and location marker must constitute a bit pattern different than that of any correction. In the present example, since for a correction there will be binary "1" in only one of the two bits of a storage position, the location marker comprises binary "1s" in both bits and the index marker is made up of binary "1s" in both bits of two adjacent storage positions. The instrument is moved to a starting position of the independent variable corresponding to the first storage position. With the instrument 11 at a first limit or starting position, which need not be an end or limit of the instrument, the data and index marker and location marker are stored in the shift register 21a and 21b in the manner shown by the example of FIG. 2a. The index marker is in the positions A–A' and B–B'. Since there are two bits in each position, they have been shown as one above the other. As will be evident from the detailed circuit diagram given below, in actuality, the positions are implemented with two parallel shift registers. In the position C-C' is the first correction data corresponding to the first or starting step of the instrument. Next to it is the location marker followed by additional data for further steps of the instruemnts. Only eight sets of such data are shown. The same information stored in D-D' is also stored in E-E' for reasons to become more apparent below. Thus, there is an overlap of one bit position between shift register section 21a and section 21b. At other times in the timing cycle, data section A—A and L-L' overlap. It will be recognized that the shift register 21a will have a much greater capacity than that shown. For example, in the embodiment to be described below, 1027 bits in each of two parallel shift registers are used to permit that many steps of the instrument.

Figure 2A:
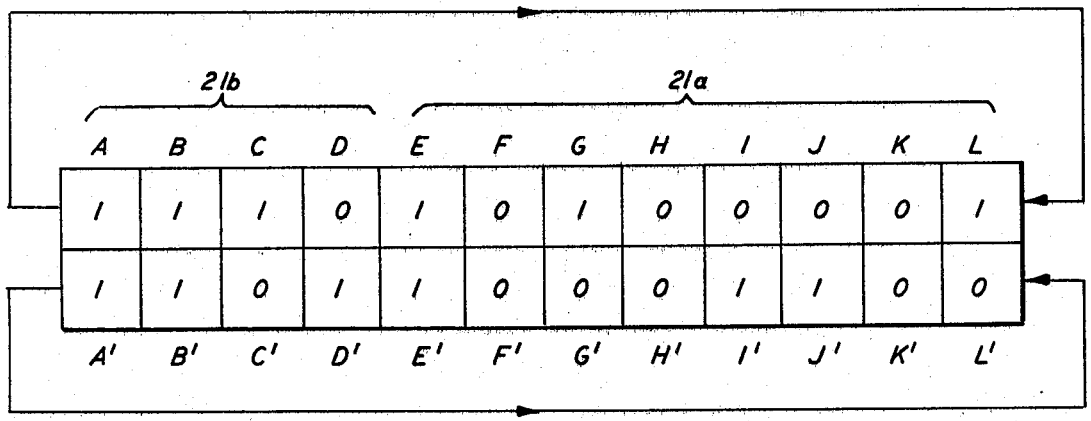
FIGS. 2a–2p are diagramatic representations of the data in the shift registers of FIG. 1 as various operations are carried out in the system.

Referring to FIG. 1 and FIG. 2a, the shift register is clocked at a rate of, for example, 1 megahertz such that the data shown on FIG. 2a continuously circultates in the direction of the arrows. The bits within the shift register 21a are not accessible. However, the bits indicated at positions A, B, C and D on FIG. 1 are accessible. They are accessible both in terms of reading out the data in each location and in terms of being able to preset or reset data in each of the shift register locations. The outputs of the shift register sections A, B, C and D, both bits in each, are inputs to a decoder 23. The decoder is capable of detecting the presence of the index in two of the sections A–D and providing an output on line 25 indicative thereof. Similarly, it is capable of detecting the location marker and providing an output indication on line 27. Output data from the section B of the register, for example, is coupled through the decoder to an output gating module 29. The output gating module is enabled from the time of the index output on line 25 until the time of the location output on line 27 during each circulation of the shift register. With the arrangement of FIG. 2a it will thus be enabled only during the time when the correction data shown on that figure in C-C' is available. Since the instrument is at the first step, this is the proper correction. This correction is provided to an output processing module 31 where it is converted to an analog value and provided on line 19 to the instrument. It must be kept in mind that the registers 21 and 21a are continuously circulating and that each time the index marker passes a predetermined location the output gating will be enabled, the data stored in the register between it and the location marker provided as an output, processed and supplied to the instrument. Thus, it is necessary that the output processing include some sort of integrating or filtering means, in particular means which can hold the value between outputs so as to maintain a continuous proper output to the instrument. Preferred means will be described in more detail below.

Figure 2B:
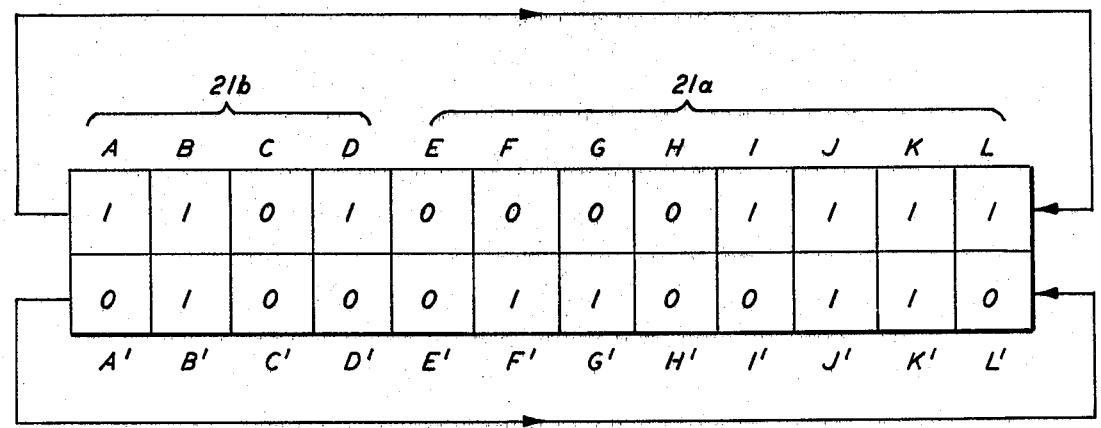

When the instrument steps, in this case steps ahead since it is at its beginning point, a signal indicative of that step will appear on line 13. The signal on line 15, in this particular case, will indicate that the step is in the forward direction. These two signals are provided to a location marker control module 33 the output of which is coupled to a location jump module 35 interposed between the shift register section 21a and the shift register section 21b. Additional inputs to location marker control 33 are outputs from decoder 23 indicating that the location marker is in position B and that it is in position C. It is essential that each time a step is made that the location marker be moved so as to be adjacent to the position of the correction value corresponding to the step of the instrument just made. The manner in which is this is accomplished in the system of the present invention can best be understood with reference to FIGS. 2a–e and the timing diagram of FIG. 3 along with the block diagram of FIG. 1.

A clock and timing module 37 provides five different output signals. The signal designated $\phi_1$ is the signal which clocks the shift register section 21a. The output $\phi_3$ is used for gating output data and will be explained below. The output $\phi_4$ is used in the decoder gating. The signal $\phi_5$ is provided as an input to the three sections or stages B, C and D of the shift register 21b and the signal $\phi'5$ to the stage A of the shift register. The relationship between the timing signals is shown on FIG. 3. The timing is illustrated for a case where the shift register 21a is an MOS shift register and the shift register 21b a bipolar shift register. Of course, the whole shift register could be implemented with bipolar devices or, for that matter, any other type of device. The MOS shift register is used simply because of its availability in a small package with sufficient bit capacity. It is because of the gap between $\phi_1$ and $\phi_5$ that an overlap of on position between section 21a and section 21b occurs.

Figure 2C:
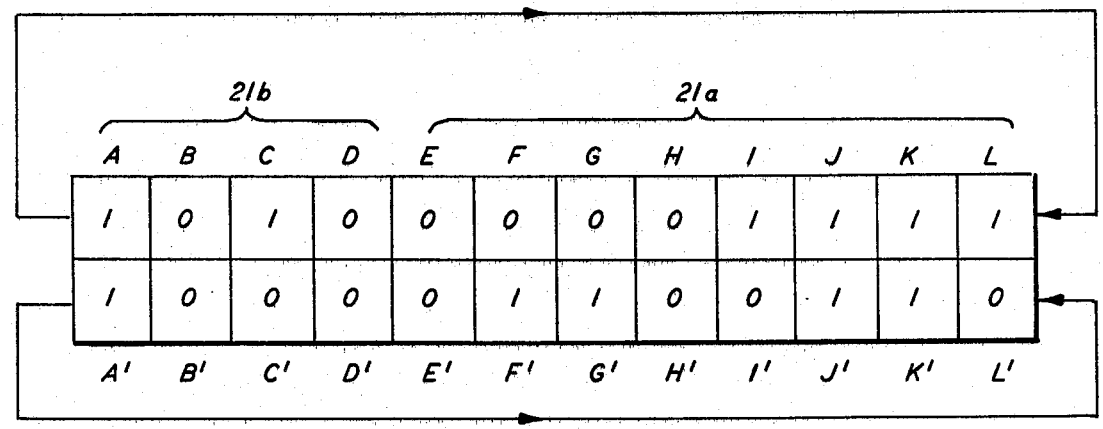
Figure 3:
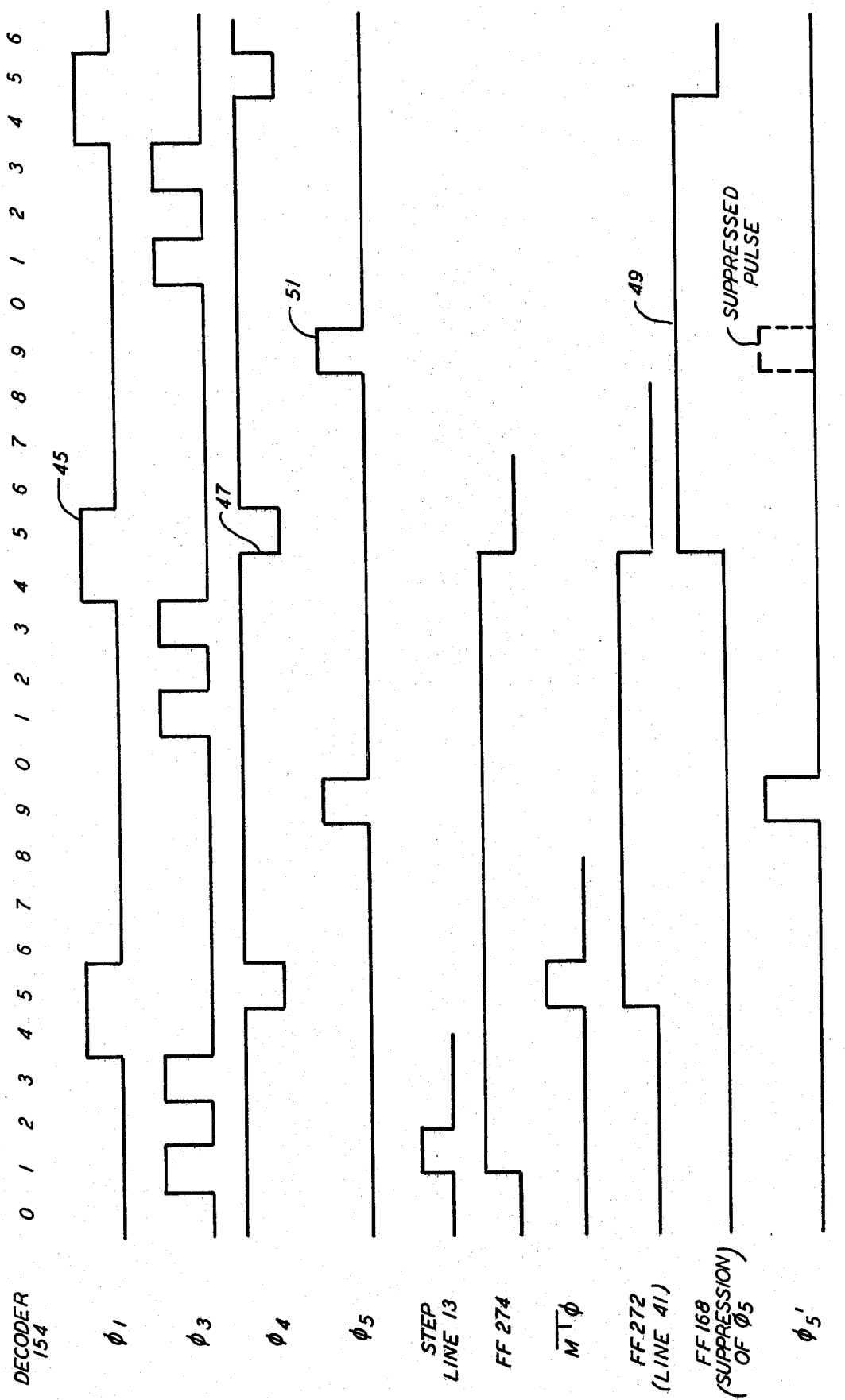
FIG. 3 is a timing diagram of the system of FIG. 1.

Assume that the data in the shift register has been shifted so that the location marker is now in the section B. The configuration would look as shown on FIG. 2b after a shift of data in section 21a, i.e., after the first $\phi_1$ pulse of FIG. 3. Decoder 23 will provide an output on line 39 indicating that the location marker is at B. Upon the occurrence of the $\overline{\phi}_4$ signal, location marker control 33, having previously stored the indication of a step, will now provide an output on line 41 to location jump module 35. At the same time this output is coupled into clock and timing module 37. The signal on line 41 is maintained for one clock cycle. The next thing which happens is the occurrence of the $\phi_5$ signal. At the same time the phase $\phi'_5$ signal also occurs. These two signals are the same except that the $\phi'_5$ signal is subject to supression. With the $\phi_5$ signal the data is shifted in each of the sections of shift register 21b to take on the configuration on FIG. 2c. Now the location marker is stored in A-A'. The next thing to occur in time is the $\phi_1$ pulse 45. Data is read in and out of the stages of shift register section 21a on this pulse. The signal on line 41 enables appropriate gates in location jump module 35 to cause the output on line 47, which is coupled to the B section of shift register 21b to be shifted into the shift register 21a. Thus, the data stored in the B-B' of FIG. 2c is shifted into the first location of shift register 21a. The configuration now appears as shown on FIG. 2d. The same data which was shifted is still also in the B section since the signals $\phi_5$ and $\phi'_5$ have not yet occurred to cause a shift in the portion 21b of the shift register. When the next $\overline{\phi}_4$ signal 47 appears, it acts to generate a suppression signal 49 and at the same reset the signal on line 41. This occurs within clock timing module 37 and suppresses the next pulse $\phi'_5$. The result is that when the next pulse $\phi_5$, pulse 51, occurs, the configuration will be as shown in FIG. 2e. In effect, the data which was in location B of FIG. 2c has jumped over the location marker. Put another way, the location marker has been moved back one so it is now adjacent the next correction value. Each time there is step forward, the same thing happens. At all other times, with the signal 41 not present, the data from the section A of the shift register 21b is loaded into the shift register 21a and the same data continually circulates.

The location marker is also moved if the instrument 11 is stepped backwards. In such a case, the step direction signal causes location marker control 33 to generate the signal on line 41 when it detects the location marker at C. In this case, instead of data jumping over the location marker, the location marker jumps over the data. When it is time to read into the memory section 21b the location marker will be in the location B. Since the gates in location jump module 35 are now enabled to read the data from the section B into shift register 21a and location marker will be read in and will, in effect, jump the data in location A. On the next $\phi_5$ clock signal for advancing the shift register 21b the signal $\phi'_5$ will be suppressed and new data will be shifted into the location B. In other words, in a reverse direction, starting with the condition FIG. 2b, the location marker will jump over to location L and in effect move one position to the left. Thus, it always remains in sychronism with the steps of the instrument. Because of this, it is possible at all times, with the data constantly circulating, to enable the output gating at the time when the index marker is encountered and disable it when the location marker is encountered to thereby get an output which is the average of all incremental changes which will correspond to the necessary correction for the present location of the instrument independent variable.

Figure 2H:
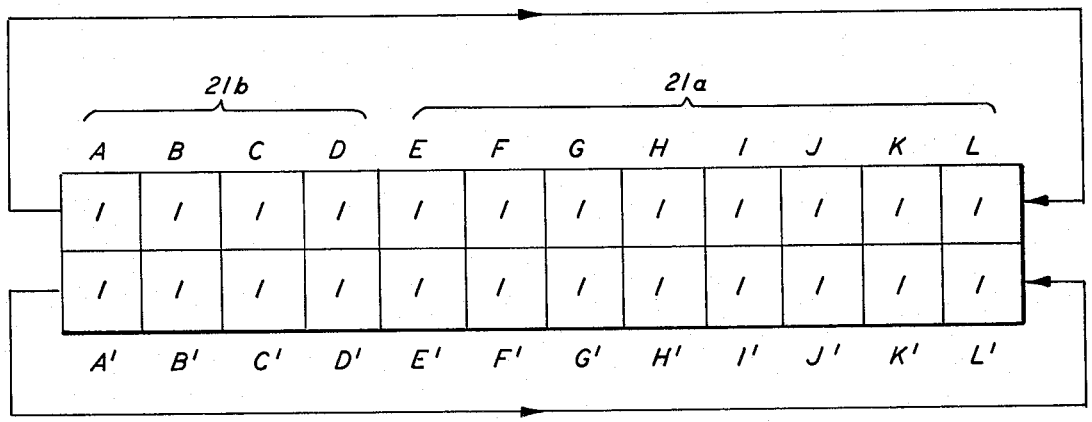
Figure 2I:
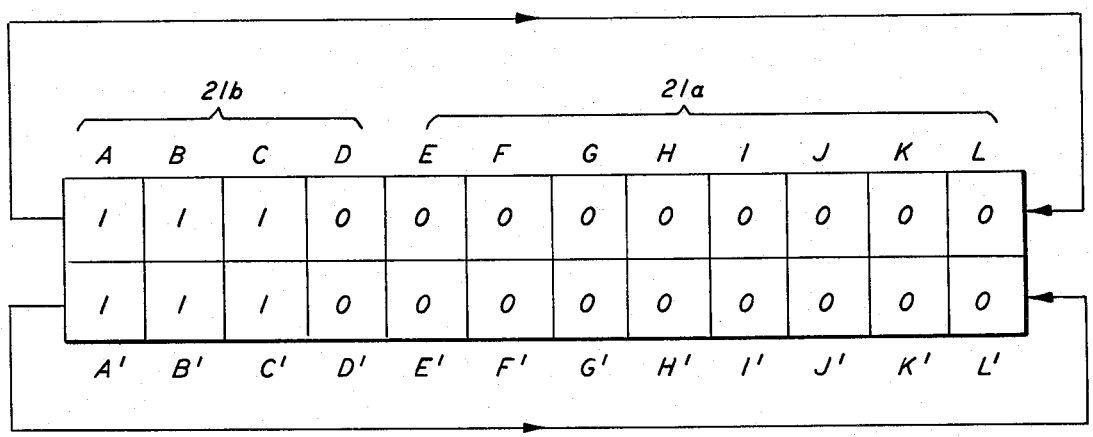

Because the memories used will generally be of a type which will lose the data when the machine is shut down, and, furthermore, in view of the fact instruments such as spectrophotometers can have errors which change with time due to temperature changes etc., means are provided to initialize and calibrate the system each time the instrument is turned on. To initialize and calibrate a switch 53 is placed in the calibrate position and a switch 55 left open as shown. Swith 53 enables an initialize block 57 to output a signal on line 67 to a preset and reset gating module 65 which then outputs a signal which causes binary "1s" to be preset in both A and A'. Thus, the configuration shown on FIG. 2g will result where the Xs indicate that the data stored in the other locations does not matter. The signal continues to preset "1s" into the A-A' positions so that after the shift register has circulated once, it will be filled with "1s". This situation is indicated by FIG. 2h. At that time the decoder 23 detects this situation and puts out a signal on line 69 to preset and reset gating 65 to reset A-A' to "0s". It will reset A-A' to "0s" for as long as the sections B-B', C-C' and D-D' contain all "1s". Thus, it will continue to set "0s" into the A locations, which will then be shifted into the shift register 21a, until the first of the "0s" get back to the locations D. This situation is illustrated in FIG. 2i. When this configuration is detected, a signal is provided on line 71 directing that the C-C' locations be reset and the D-D' locations be preset to obtain the configuration shown in FIG. 2j. This is the same configuration which was shown on FIG. 2a as the starting point for running with data loaded and the instrument at a limit position. Once initizlized, with the instrument at the point where calibration is to start, data is loaded in, always at the B-B' positions by presetting and resetting the B and B' storage locations. As indicated, line 40 which gives an indication that the index is at C is used as an enabling signal for input gating 59. Thus, after one shift from the position shown in FIG. 2a or FIG. 2j, two "0s" are in B-B' between the index and the location markers. The input gating 60 is enabled to load into that location whatever signals appear on the lines 61 and 63 from an input processing module 60 which converts the analog error signal on line 17 to a digital signal on lines 61 and 63. The instrument is stepped and the location marker stepped along with it in exactly the manner explained above for operation in the run mode. With each step the error correction for that step is read into the shift register. The instrument is continued to be stepped forward until as much as calibration data as needed is stored. In other words, the instrument is stepped from the position at which it is desired to start operation to the position where it is desired to end operation. In a spectrophotometer this could be the full range of the intrument or only a part of that range. Once the data is stored, the switch 53 can be moved back to the run position and the instrument moved backward and forward with the location marker at all times following the stepping of the instrument. And, as explained above, this makes possible at any time providing as an output the average value between the index marker and the location marker. Furthermore, it should be noted that because the system is calibrated in a closed loop, with the corrections being fed to the instrument during calibration, there does not have to be a strict linear relationship between the analog error input and the correction output. Any non-linearities will be cancelled out because of the closed loop.

The next mode of operation is that of re-calibration. At any step of the instrument a recalibration is possible. If such is desired, the inhibit switch 55 is closed to prevent a reinitialization and the switch 53 placed in the CAL position. This enables the input gating to couple the error from input processing module 60 into the locations B–B' at the time when the index is detected in the C–C' locations. The input gating includes gating to insure that two "1s" are not loaded in B and B'. To accomplish this, the gating resets to "0" the one of the bit positions into which a "1" is not being loaded.

A further feature of the system of the present invention comprises the ability to maintain synchronization even if the instrument is moved below the range where calibration was started. As will be explained more fully with the aid of the detailed drawing of FIG. 4, if in stepping down the configuration shown in FIG. 2*i* is reached, the direction of movement of the location marker is automatically reversed.

This causes it to be moved away from the index marker as long as the instrument is stepped below the calibration range. When the instrument is again reversed, the location marker continues to move in a direction opposite to which it would normally move, toward the location marker until it reaches the position of FIG. 2*i* at which time it direction is reversed and normal, calibrated operation takes place again.

Figure 4A:
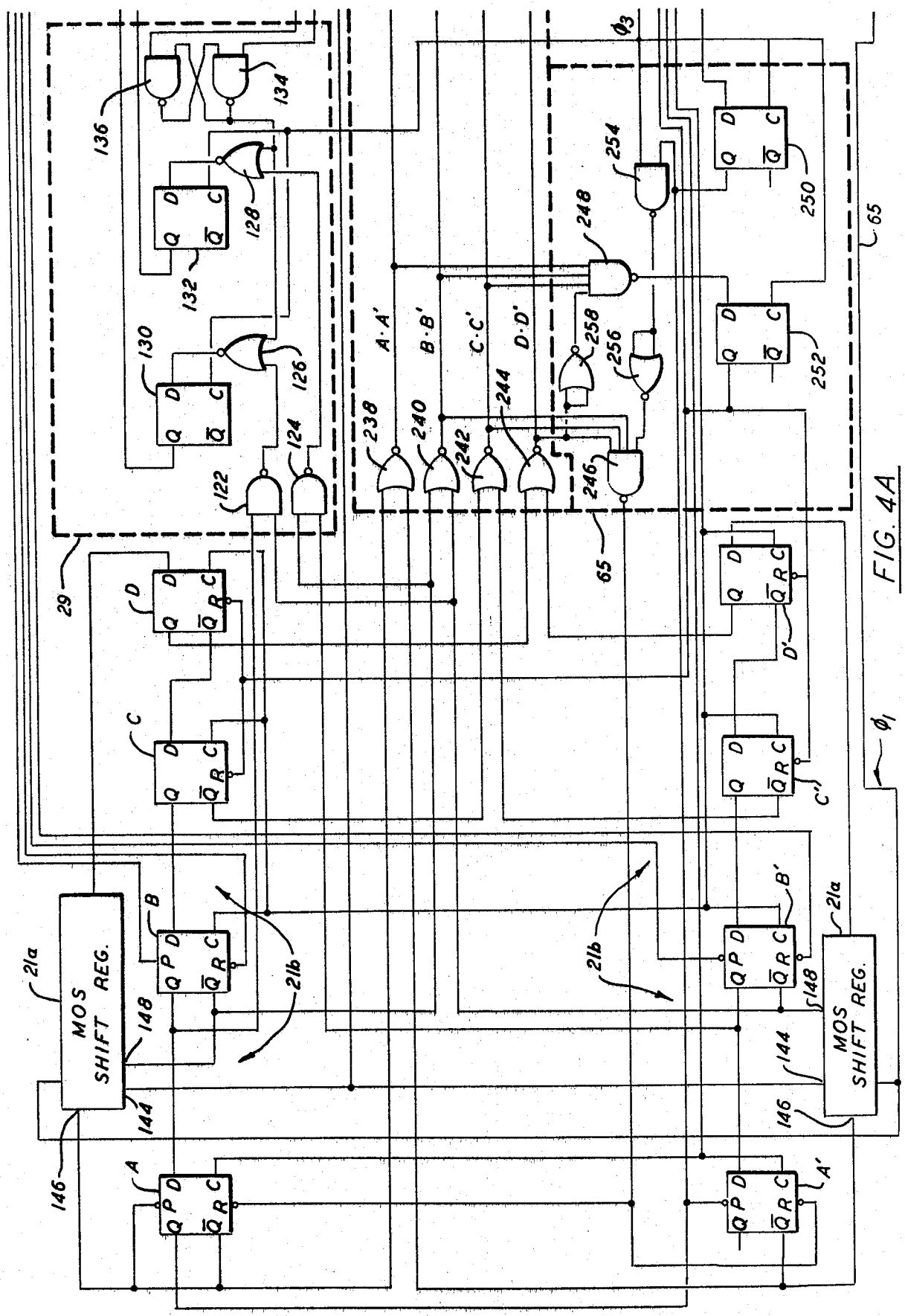
FIGS. 4a and 4b are a logic diagram of the system of FIG. 1.
Figure 4B:
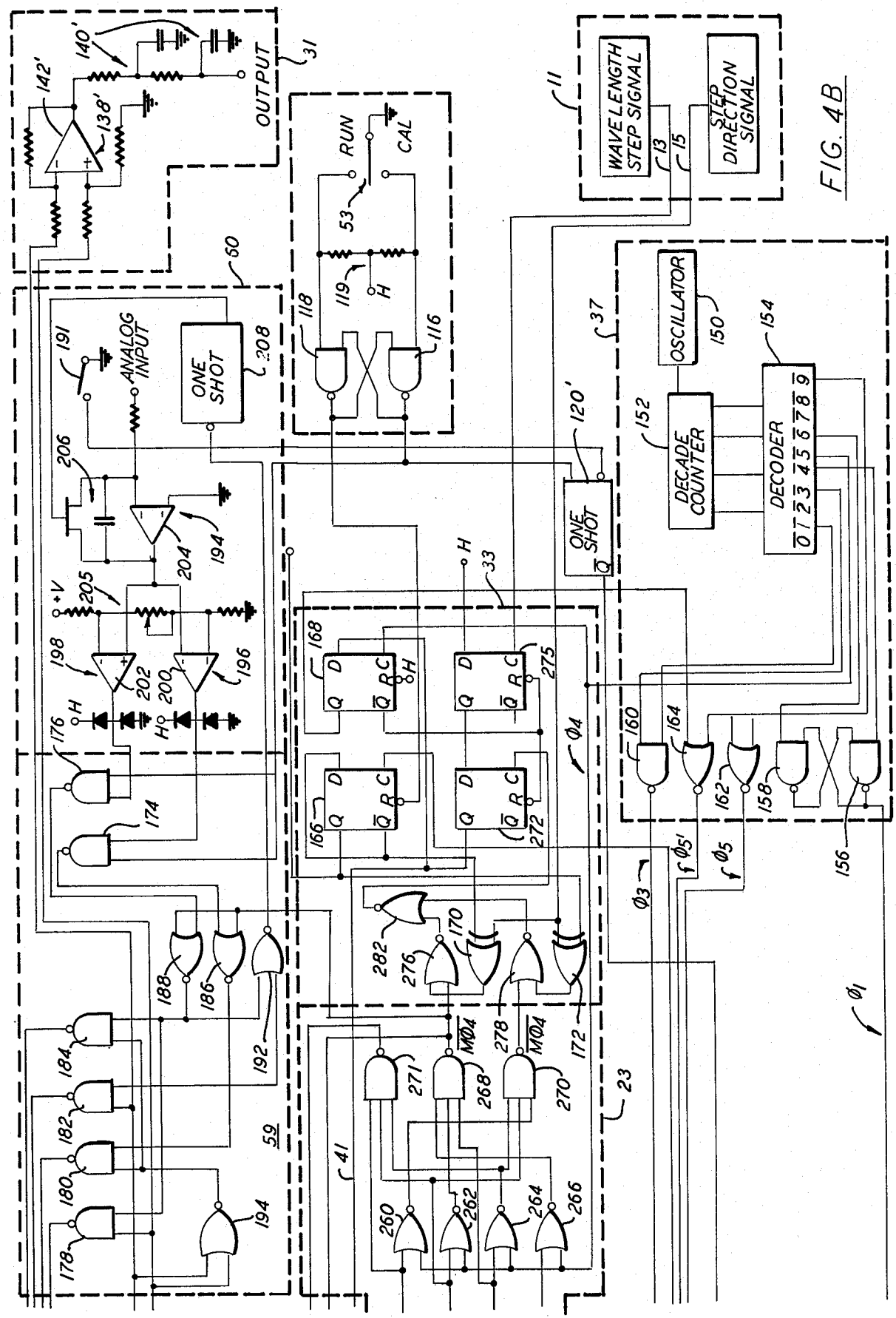

FIGS. 4A and 4B are more detailed logic diagrams of the system illustrated by FIG. 1. Referring to FIG. 4B, which when placed along the right hand side of FIG. 4A makes a single logic diagram, the nature of the clock will first be explained. The clock 37 has as it basic timing element an oscillator 150. In the specific embodiment shown on FIG. 4B the oscillator operates at 10 megahertz. The output of oscillator 150 is the input to decade counter 152 whose output is decoded in decoder 154. The outputs of decoder 154 are used to generate the timing signals $\phi_1$, $\phi_3$, $\phi_4$ and $\phi_5$. The $\phi_1$ signal is obtained from a NAND gate 156. The nature of a NAND gate is such that only when both of its inputs are digital "0's" will it have a "1" output. NAND gate 156 is cross coupled into a latch configuration with NAND gate 158. NAND gate 158 receives an input from the $\bar{6}$ output of decoder 154 and NAND gate 156 an output from the $\bar{4}$ output of decoder 154. Prior to the time when fifth count occurs and the $\bar{4}$ output changes state it will present a "1" to the input of NAND gate 156. With this "1" on the input and another "1" from gate 158, NAND gate 156 has a "0" output which is coupled back to NAND gate 158 causing it to maintain its "1" output. When the $\bar{4}$ bit in decoder 154 changes from a "1" to a "0", the output of gate 156 changes from a "0" to a "1". This change results in two "1s" at the input to gate 158 and its output changes to a "0" latching the gate 156 so that when $\bar{4}$ goes back to a "1", there will still be a "0" and a "1" present to maintain its output at "1". This output remains until $\bar{6}$ becomes a "0" at which time the output of gate 158 changes from a "0" to a "1". Now, with two "1" at its input, gate 156 goes back to "0". Thus, the waveform $\phi_1$ shown on FIG. 3 results at the output of gate 156.

The $\bar{9}$ output of decoder 154 is simply fed into both inputs of a NOR gate 162. NOR gate 162 when so configured acts as an inverter. Thus, when $\bar{9}$ goes from a "1" to a "0" on the tenth count, the output of gate 162, the $\phi_5$ signal, goes from a "0" to a "1". The $\bar{\phi}_4$ signal is taken directly from the $\bar{5}$ output of the decoder 154. The $\phi_3$ signal is obtained from the output of a NAND gate 160 having as inputs the $\bar{1}$ and the $\bar{3}$ outputs of decoder 154. Normally, both of these outputs will be "1" and the NAND gate will have a "0" output. However, when $\bar{1}$ becomes a "0" or when $\bar{3}$ becomes a "0" the NAND gate output will go to a "1" as shown on FIG. 3. A NOR gate 164 is used to provide the $\phi'_5$ output. It has as an input the $\bar{9}$ output of the decoder plus an enabling input from a flipflop 168 to be described below. The nature of a NOR gate is such that only when both of its inputs are "0" will it have a "1" output. For every other combination its output is a "0". Thus, in order for NOR gate 164 to have a "1" output when the $\bar{9}$ output from the decoder goes to "0", its second input must be enabled with a "0". Thus, if the flipflop 168 is set the gate 164 will be disabled from providing pulses at its output.

As indicated above, the two bits per storage position are obtained by using two circulating shift registers in parallel. Thus, in FIG. 4A there are shown the stages A–A', B–B', C–C' and D–D' of shift register portion 21*b* each operating in series with a shift register 21*a*. Each of the flipflops used for stages A–A', B–B', C–C' and D–D' are a D type flipflop. The flipflops have a D input standing for data, a C or clock input, a preset input P and a reset input R. Each flipflop has two outputs designated Q and $\bar{Q}$ in conventional fashion. The nature of these flipflops is such that if they are preset a "1" will appear at the Q output and a "0" at the $\bar{Q}$ output. If reset, a "1" will appear at the $\bar{Q}$ output and a "0" at the Q output. In clocked operation, the data i.e., a "1" or a "0" present at the D input at the time a clock pulse appears on the C input will be transferred to the Q output. The Q and $\bar{Q}$ outputs are always complementary in conventional fashion. Shifting occurs in a direction from D to C to B to A then through the bits of the shift register 21*a* and back to D. Because of the nature of the clocking the stage D stores the same information as the last bit of the shift register 21*a*. For reasons to be pointed out below input data which is a binary "1" is stored in the shift register 21*a* as a binary "0". When a binary "0" is shifted into the flipflop D, its $\bar{Q}$ output will be a "1". Thus, the $\bar{Q}$ outputs of flipflops D and D' are the D inputs to flipflops C and C'. On the next shift this "1" will be at the D input of flipflop C and will become a "1" at its output. It will continue as a "1" as it is shifted through stages B and A but, upon leaving stage A, it becomes a "0" again since the output to the shift register 21*a* is taken from the $\bar{Q}$ rather than the Q output. Also, the location jump gating 35 shown on FIG. 1 is not required in this embodiment since a shift register 21*a* which is capable of selecting as its input either line 146 or 148 in response to a signal on line 144 is utilized. In other words, the gating is internal in the shift register. Thus, in order to carry out the jump function, the $\bar{Q}$ output of the flipflops B and B' are also provided as inputs on lines 148 to the shift registers 21a.

Operation will be explained starting with the initialization. Switch 53 is used to couple a ground of "0" input to either one of two NAND gates 116 and 118. A resistive network 119 coupled to a high or logical "1" voltage maintains the input to the other at a logical "1". When switch 53 is placed in the calibrate position, assuming that the switch 55 is open so as not to inhibit initialization, a one shot 120 is fired. Its $\bar{Q}$ output goes from "1" to "0" and remains at "0" for at least two shift register cycles. The $\bar{Q}$ output of one shot 120 is the D input to a flipflop 250. This flipflop obtains as its clock input the $\phi_3$ signal. Thus, on the next $\phi_3$ pulse its Q output becomes a "0". This "0" is fed to the preset inputs of the flipflops A and A' causing "1" to preset therein i.e., at their Q outputs. As explained above, the clock in the form of the pulses $\phi_5$ for the bipolar flipflops A-A' to D-D' and in the form of the signal $\phi_1$ for the MOS shift register 21a clocks these "1's" through the whole shift register so that it eventually, fills with "1s". The $\bar{Q}$ outputs of the flipflops A and A' are inputs to a NOR gate 238, the $\bar{Q}$ outputs of flipflops B and B' to a NOR gate 240, the $\bar{Q}$ outputs of flipflops C and C' to a NOR gate 242 and the Q outputs of the flipflops D and D' to a NOR gate 244. (Q outputs are used because of the "0"–"1" reversal noted above.) A NOR gate will have a "1" output only when both inputs are "0". The respective $\bar{Q}$ outputs will be "0" only when the Q outputs are "1". Thus, when the flipflops B, B', C, C', and D, D' all are loaded with "1s" a "0" in the D and D' flipflops representing an actual "1", there will be "1s" outputs from all of the gates 240, 242 and 244 (FIG. 2b). These outputs of gates 240, 242 and 244 are inputs to NAND gate 246. NAND gate 246 has an additional enabling input from NOR gate 256 which is wired as an inverter and which in turn obtains its input from NAND gate 254 having as inputs the output of the flipflop 250 and the clock signal $\phi_3$. Each time the $\phi_3$ signal appears there will be two "1s" at the input of NAND gate 254 and its output will go to "0". This in turn will appear as a "1" out of NOR gate 256. If the outputs of gates 240, 242 and 244 are also "1" indicating that the "1s" have circulated around and filled the stages B, C and D of the shift register, the output of NAND gate 246 will become a "0". This "0" provides a reset as long as there are "1s" in the stages B, C, D and B', C' and D'. Now, as explained above, the shift register begins to fill with "0s". However, as soon as the first "0s" reach the flipflops D and D' (FIG. 2i), the output of gate 244 will become a "0" and the output of gate 246 a "1", removing the reset input. The output of gate 244 is inverted through a NOR gate inverter 258 the output of which is one input to a NAND gate 248 having as its other inputs the outputs of gates 238, 240 and 242. These gates will still have "1" outputs since there are still "1s" in each of the flipflops A-A', B-B' and C-C'. Thus gate 248 responds to the condition shown in FIG. 2i so as to have a "0" output. On the next $\phi_3$ clock pulse this "0" output of gate 248 is loaded into flipflop 252 whose Q output then becomes a "0" and this "0" is coupled to reset the flipflops C-C' and D-D'. The result will be as shown on FIG. 2j, keeping in mind that a "0" in flipflops D and D' actually represents a data "1" because of the way they are interconnected. The reason for this is that it permits using a package of four bipolar flipflops with a common reset line. With respect to flipflops 250 and 252, note that they had been loaded with "1s" at their Q outputs by the "1" outputs from one shot 120 and gate 248 respectively before the outputs of one shot 120 and gate 248 changed as described above.

Input of Data

Figure 2J:
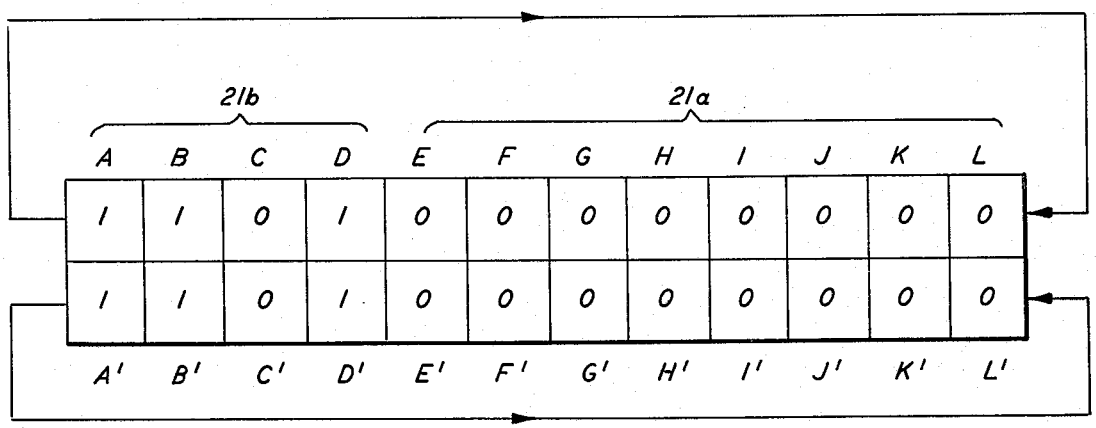

With the configuration on FIG. 2j obtained, the index marker and location marker have been established with the proper relationship and data can now be loaded. The analog input from the instrument is coupled through an appropriate resistor to an integrator 194 comprising an amplifier 204 with a capacitor in its feedback path. Coupled across the capacitor is a switch in the form of a field effect transistor for resetting the integrator. Integrator 194 begins to integrate the error. Its output is coupled respectively to the non-inverting input of an amplifier 202 and the inverting input of an amplifier 200. These amplifiers are utilized in conjunction with a resistor divider network 204 to act as comparators. One acts as a comparator in the positive direction and other in the negative direcation. Both have diode limiting on their outputs so as not to place too high a voltage on the digital hardware which follows them. The resistor divider network is set so that the comparators 196 and 198 respond to the analog increment which is set equivalent to a digital "1" either positive or negative. Positive errors are detected at the comparator 198 and negative errors at the comparator 196. The output of comparator 198 is an input to NAND gate 176 and the output of comparator and input to NAND gate 174. These NAND gates are enabled by a signal from NAND gate 116, part of the latch of the mode selection circuit. Thus, if one of the comparators detects a positive of negative error, and assuming that the system is still in the calibration mode and there is a "1" output from the gate 116, one of the gates 174 and 176, depending on the direction of the error, will have an output which goes to "0". The outputs of gates 174 and 176 are respective input to gates 186 and 188 which are both NOR gates. These NOR gates are enabled by the output of gate 268. As previously explained, it is necessary that input data be loaded into the locations B-B'. This enabling signal accomplishes this. Before explaining the manner in which the signal, which is designated on the diagram $M\phi_4$, is obtained from gate 268 it should be noted that the outputs of gates 186 and 188 are respectively inputs to gates 180 and 184. Gate 180 is coupled to the preset input of flipflop B' and gate 184 to the preset input of flipflop B. The outputs of gates 186 and 188 are also coupled respectively inputs of gates 182 and 178. The outputs of these gates are connected to the respective reset inputs of the flipflops B and B' and are used to reset the one of the flipflops in which a "1" is not being loaded in case there is already data stored therein. The manner in which these gates are enabled will be explained in greater detail below. For now, assume that they are enabled. It is proper to load data into B and B' when the location marker is in C and C'. The location marker will be in C and C' when there are "1s" in both of those locations but not both "1s" in either D and D' or B and B' since this latter condition would indicate that it was the index marker rather than the location marker which was present. Thus, the output of gate 242 which is indicative of C and C' is coupled into a NAND gate 268. The second two inputs into NAND gate 268 are the outputs of gates 262 and 266, both NOR gates which have inputs respectively the outputs of gates 240 and 244. All of the gates 260, 262 and 264 and 266 are enabled by the $\phi_4$ signal.

The gates 262 and 266 have as respective inputs the B-B' signal from gates 240 and D-D' signal output from gate 244. Thus the outputs of these gates will indicate the situation not i.e. $\overline{B \cdot B'}$ and $\overline{D \cdot D'}$. Thus, if $\overline{B \cdot B'}$ is a "1" and if $\overline{D \cdot D'}$ is a "1" but C · C' is a "1", during $\phi_4$ there will be all "1" inputs to gate 268 and it will have a "0" output. This "0" output then enables the gates 186 and 188 so that input data may be loaded.

Location Marker Jump

The marker jump operates the same way whether reading data in or reading data out. The wavelength step signal from the instrument 11 is the clock input to flipflop 274 which always has a high ("1") signal on its data input. This, when a wavelength step occurs, the Q output of flipflop 274 becomes a "1". This "1" then appears at the D input of flipflop 272. Flipflop 272 is clocked by the output of a NOR gate 282. NOR gate 282, in turn, has inputs from NOR gates 276 and 278. NOR gate 276 has as one input the output of gate 268 described above which will provide an output signal during $\phi_4$ timing signal when the location marker is in the C and C' locations. Gate 270 similarily provides an output when the location marker is in the B and B' locations. To accomplish this, it has one input taken directly from NOR gate 240 and other inputs from NOR gates 264 and 260, to distinguish between the location marker and index marker. Gate 276 is enabled by an exclusive OR gate 170. Exclusive OR gate 170 has one input from the step direction signal out of the instrument and its other input from the $\overline{Q}$ output of flipflop 166. The Q output of flipflop 166 along with the step direction signal are inputs to the exclusive OR gate 172 the output of which is the enabling input to gate 278. Flipflop 166 is normally reset and its $\overline{Q}$ output will be a "1". i.e. it is reset by the "0" output of latch gate 118 during calibration. Since calibration is always done when starting, each time the system is used flipflop 166 will be initially reset. Thus, normally, gate 170 will have a "1" output unless the step direction signal is also a "1". On the other hand, the Q output of flipflop 166 will be a "0", and the output of exclusive OR gate 172 will remain at "0" except when a step direction signal appears, at which time its output will become a "1". The step direction signal is a "0" for a forward step and a "1" for a backward step. Thus, with the flipflop 166 reset gate 276 will be enabled for steps in the forward direction and gate 278 for steps in the backward direction. Under normal conditions the outputs of gates 276 and 278 are both "0" and the output of gate 282 is a "1". Assuming moving in the forward direction and the "0" input on the step direction signal, the output of gate 172 will be a "0" and the output of gate 170 a "1". The result of this is that when the output of gate 270 becomes "0" there will be two "0s" at the input of gate 278 and it will have a "1" output causing the state of gate 282 to change to clock the flipflop 272 causing the "1" at the Q output of flipflop 274 to appear at the Q output of flipflop 272. This will occur when the location marker is in the B-B' location i.e. there will be all "1s" at the input to gate 270. The signal from the Q output of flipflop 272 is the input 144 to the shift register sections 21a telling them to take their input from the input 148 instead of 146. Referring again to the timing diagram it is noted that the output at gate 270, because of the $\overline{\phi_4}$ input to the gates 260, 262, 264 and 266 will not appear until the $\overline{\phi_4}$ pulse appears. This occurs after data has been read into sections 21a by the $\phi_1$ pulse. The condition detected which set the flipflop 272 is the condition illustrated by FIG. 2b. Again referring to the timing diagram of FIG. 3 the next timing pulse to occur is $\phi_5$. This results in all the data in the section A, A' to D, D' being shifted one position to the left to result in the configuration shown on FIG. 2c. Now the pulse $\phi_1$ occurs again and the configuration shown on FIG. 2d takes place. i.e., the data in the section B of the shift register is read into the sections 21a. The Q output of flipflop 272 is the data input to flipflop 168. On the next clock pulse $\overline{\phi_4}$, the "1" present there is read into flipflop 168 and its $\overline{Q}$ output goes to "0" resetting flipflops 274 and 272. Its Q output, as was mentioned above, is the enabling input to gate 164 from which the $\phi'_5$ timing signal is derived. With this signal now a "1" the gate is disabled and, as explained above, the next $\phi'_5$ pulse suppressed so that the configuration of FIG. 2e is attained on the next $\phi_5$ pulse with the location marker in the A-A' flipflops. Since the flipflop 272 has been reset, on the next $\overline{\phi_4}$ pulse, flipflop 168 is reset to remove the suppression so that data can again advance through all stages of the shift register in normal fashion. Furthermore, since flipflops 272 and 274 have been reset, data from A-A' will go into the sections 21a of the shift register on lines 146. Circulation will continue in this manner until another wavelength step signal is received.

Now, assume that the step direction signal is reversed and becomes a "1". Again remember that the flipflop 166 is reset having a "1" and its $\overline{Q}$ output and a "0" at its Q output. Thus, there will be two "1s" at the input of exclusive OR gate 170 and it will have a "0" output. There will only be a signal "1" at the input to exclusive OR gate 172 and it will have a "1" output. Now, it is the gate 276 which will respond to the signal from gate 268 indicating that the location marker is in the C location. Again, the flipflop 272 will be set by the signal from gate 82 when this occurs. This in turn will enable the shift register sections 21a to receive data from the $\overline{Q}$ outputs of the sections B and B'. On the next advance of the bipolar portion of the shift register the "1" of the location marker previously in C and C' will be moved to B and B' to take on the configuration shown in FIG. 2b. Now when the $\phi_1$ signal occurs the location marker will be loaded into the shift register sections 21a jumping over the data in location A-A'. Once again the flipflop 168 will act to reset flipflops 272 and 274 and to disable gate 164 to suppress the $\phi'_5$ signal for one clock cycle so as to permit the data to advance.

The Output Circuits

As explained above data is output continuously between the index marker and location marker. This means that the index marker must be detected and data output started at that time and the location marker detected and data output terminated at that time. It has been seen that the gates 268 and 270 will identify the location marker. Thus, all that is needed is something to identify the index marker. This is accomplished by NAND gate 271. NAND gate 271 has as inputs the outputs of gates 238 and 240 and the outputs of gate 264; thus, gate 271 will have an output which goes from "1" to "0" when the index marker is in the sections A-A' and B-B' and there is not a pair of ones in C-C' during the occurance of the $\overline{\phi_4}$ timing pulse. In other words it identifies the index marker. The output of gate 271 is used to set a latch made up of a cross coupled NAND gates 134 and 136. This latch is, in turn, reset by the output of gate 268 indicating that the location marker is at C–C'. The output of gate 134 is an enabling input to NOR gates 122 and 126. These gates have their outputs coupled respectively to the data inputs of flipflops 130 and 132. These flipflops are clocked by the $\phi_3$ signal. The second inputs to gates 122 and 126 are from gates 124 and 122 respectively, both NAND gates. Gate 122 has as a first input the Q output of flipflop B and gate 124 as its first input the Q output of flipflop B'. The second input to gate 122 is the $\bar{Q}$ output of B and second input to gate 124 the $\bar{Q}$ output of B'. Gate 122 will thus have a "0" output when B has a Q output of "1" and there is a "0" in B'. Similarily gate 124 will have a "0" output when there is a "1" in B' and a "0" in B. If there is a "1" in both B and B' there will be an output from neither gate. This enables these gates to distinguish between data and an index or location marker. A "0" at gate 122 or 124 is converted to "1" in the gate 126 or 128 when those gates are enabled. Then, on the next $\phi_3$ pulse a "1" at one of these gates will be set into the flipflops 130 and 132. Thus, referring to FIG. 2f for example, at the occurence of the $\phi_3$ pulse, when the data shown at B–B' is present, with the gates 126 and 128 enabled the output of gate 122 will be a "1" and the output 124 a "0". The output of gate of 126 will be a "0" and the output of gate 122 a "1". Thus, a "0" will be loaded into the flipflop 130 and a "1" into the flipflop 132. After one step of the clock advancing the data, that step occurrring on the $\phi_5$ pulse, there will be the two "0s" which were formerly in C and C' in B and B'. Now these "0" will be loaded into both flipflops 130 and 132. The outputs of flipflops 130 and 132 are coupled as inputs to a differential amplifier 142, the output of flipflop 130 being coupled through a resistor into the inverting intput and the output of flipflop 132 through a resistor to the non-inverting input. If both inputs are "0", the amplifier will have a "0" output. If there is a binary "1" from the flipflop 130 then a positive output will appear and if there is a binary "1" on flipflop 132 a negative output will appear. This output is coupled through a low pass filter which will average the signals occurring between the index marker and the location marker to result in an average corresponding to the error at the point where the location marker is. By using incremental data and continuously circulating it, reading out the data between the index and location marker and averaging it through a low pass filter, a digital to analog conversion is carried out in a very simple fashion. The waveforms resulting from this digital to analog conversion of the data shown on FIG. 2f are illustrated on FIGS. 5a, b, and c. FIG. 5a shows the nature of the pulses which are input to the amplifier 142 and FIG. 5b the output of the filter. FIG. 5c show the filter output as a function of the number of steps i.e. the number of storage postions of FIG. 2f which are averaged. Because of the high rate of circulating in the register and the filtering effect of the low pass filter, only this final value shown on FIGS. 5b and c will appear on line 19.

Data Input Timing

The manner in which data input timing is accomplished and in which it is prevented that two "1" are stored when correcting data will now be explained. The outputs of the flipflops 130 and 132 are used as inputs to gates 178, 180, 182 and 184. The Q output of flipflop 130 is an input to gate 182 and the Q output of flipflop 132 is an input to gate 178. The two Q outputs are also combined in a NOR gate 190 which provides inputs to gates 180 and 184. Assume that sufficient error has accumulated to trigger one of the comparators 196 and 198. Assume that it is comparator 198 and that two "1s" now appear at the input of gate 176 so that it has a "0" output. When the output of gate 268 becomes a "0", indicating that the location marker is in the C–C' flipflops, and thus, data can be loaded in the B–B' flipflops, the output of gate 188, having two "0" inputs will now become a "1". If the output of gate 194 is a "1", there will be two "1s" at the input of gate 184 and its output will become a "0" presetting a "1" into flipflop B. The output of gate 194 will be a "1" only if both its inputs are "0" i.e. only if the data in B and B' is both "0". During initial calibration this should be the case. However, during the recalibration mentioned above it is possible that there will be a "1" stored in B' for example (if there is a "1" in B it really doesn't matter since that is what is being put back in) A "1" in B' would have caused a "1" from the Q output of flipflop 132. Note that these flipflops are set by the $\phi_3$ pulse which occurs before the $\bar{\phi}_4$ pulse which enables the gates 186 and 188. The "1" in flipflop 132 will cause the output of gate 190 to be a "0" and will prevent a "1" from being set in B. However, this "1" is also an input to gate 178. When a second "1" appears from gate 188 its output will become "0" and will reset B'. Now the output of gate 194 will change to a "1" and the output of gate 184 to a "0" to load a "1" into B. In similar fashion, if there is an attempt to load a "1" into B' and there is already a "1" in B, the "1" in B will first be reset by gate 182 after which gate 190 will enable gate 180 to preset the "1" in B'. The outputs of gates 188 and 186 are inputs to NOR gate 192. Whenever a comparison results on the occurence of the output of gate 268, one of these gates will have an output going from "0" to "1". Thus, the output of gate 192 is normally a "1". If there is data being input and the output of either gate 186 of gate 188 changes, its output goes to "0". This output is used to fire a one shot multivibrator 208 which resets the integrator 194 by shorting out its capacitor across the field effect transistor 206. This insures that the input data is of an incremental nature. The integrator 194 accumulates error until the error reaches the value assigned a digital "1". At this point the digital "1" is loaded into the shift register and the integrator reset. As will be seen below, it is preferred that when calibrating or, before beginning to step the wavelength or other variable ahead, that the instrument be zeroed so that there is initially no error. Otherwise, a series of "1s" will be loaded into the shift register until the pre-existing error is cancelled out. Over this range the correction will not be accurate.

Below Range Operation

As was pointed out above, the calibration need not be started at an end point of the instrument. Any arbitrary limit may be chosen. This means that in operation it is possible to operate the instrument below the range over which it is calibrated. In order to prevent loss of synchronism with the step signal when going below the calibration range a "bounce" feature is incorporated in the system of the present invention. If the instrument is stepped down it will eventually reach the condition shown in FIG. 2b. After one further step the index marker will be directly adjacent the location marker as shown in FIG. 2i. At this point, the gate 248 will have all "1s" at its input since there will be "1s" in both of the A flipflops, in both of the B flipflops and both of the C flipflops. In the D–D' flipflops there will be either two "0s" or a "1" and a "0". Since NOR gate 258 is wired as an inverter it will have a "1" at its output if its input is a "0". This input is obtained from NOR gate 244. It will have a "0" output at any time except when its two inputs are "0". Thus, when the configuration of FIG. 2*i* occurs the output of gate 248 will change to a "0" and on the next $\phi_3$ pulse this "0" will be loaded into flipflop 252. This will reestablish the condition shown on FIG. 2*j* and will at the same time clock flipflop 166 which is no longer being held reset. Its $\bar{Q}$ output is coupled back to its data input and when the clock pulse appears its Q output will change to a "1".

Now, the inputs to the exclusive NOR gates 172 and 170 are reversed. This, in turn, reverses the direction of the stepping. Now, while stepping downward the location marker moves away from the index marker and when stepping upward it moves toward the index marker. When the step signal is again stepped up to the point of calibration the configuration of FIG. 2*i* again results and the same thing happens again except now, since the flipflop 166 was set with a "1" at it Q output, the "0" at its $\bar{Q}$ output is read in when it is clocked and the system restored to normal operation. Normally, if the system is zeroed at the initial point, the D-D' location of FIG. 2*i* will contain two "0" and there will be no loss of data. However, with the resetting just described, any data which was stored in the D-D' of FIG. 2*i* will be lost upon reversing. There will be no further loss of further re-reversing to resynchronize since it will be these two "0" which then appear in the D-D' flipflops. This is illustrated by FIGS. 2*k*-2*p*. Once the situation shown in FIG. 2*k* is reached the bounce reset just described is carried out so that the data takes on the configuration shown in FIG. 2*l* (the same data pattern assumed in FIG. 2*a* is being used herein). Then the location marker begins to move away from the index as shown in FIG. 2*m* at a point where it has made two jumps. In FIG. 2*n* it is shown moving back toward the index marker until finally in FIG. 2*p* it is back adjacent the index marker. The reset referred to above takes place and the configuration is again as shown on FIG. 2*k*. In each case the configuration after the $'_1$ timing signal and before $\phi_5$ is shown. i.e., the data overlap is between A-A' and L-L'.

Recalibration

During recalibration the same things happens as happens during initial calibration except that the one shot 120 is not utilized to carry out initialization. To prevent this, the switch 55 is closed to disable the one shot from outputting a pulse when the switch 53 is moved from the run to the calibrate position. Thus, at any position while operating the instrument a recalibration can be carried out simply by throwing the switch into the calibrate position and feeding back the error. As mentioned above, the gating arrangement including the gates 178-184 insure that two "1" are not loaded into a data location.

Calibration Feedback Loop

Figure 6A:
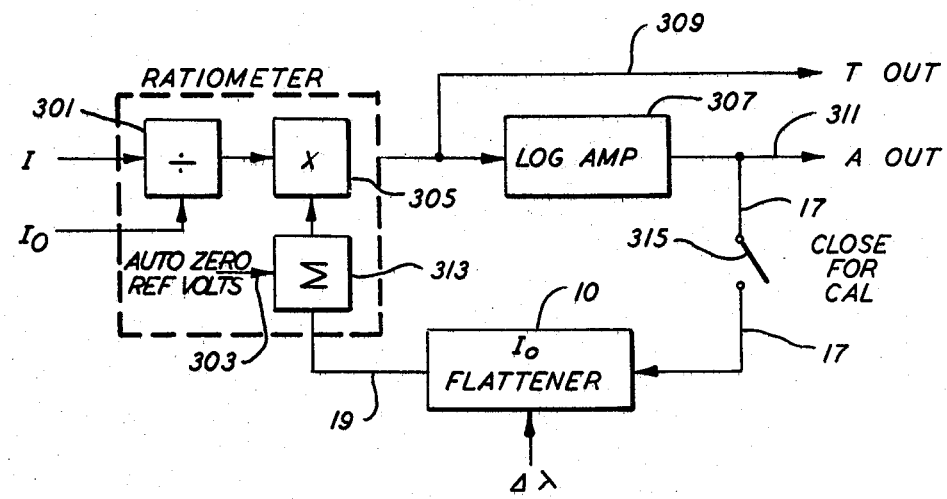
FIGS. 6a and 6b are block diagrams illustrating closed loop calibration with two different types of spectrophotometers.
Figure 6B:
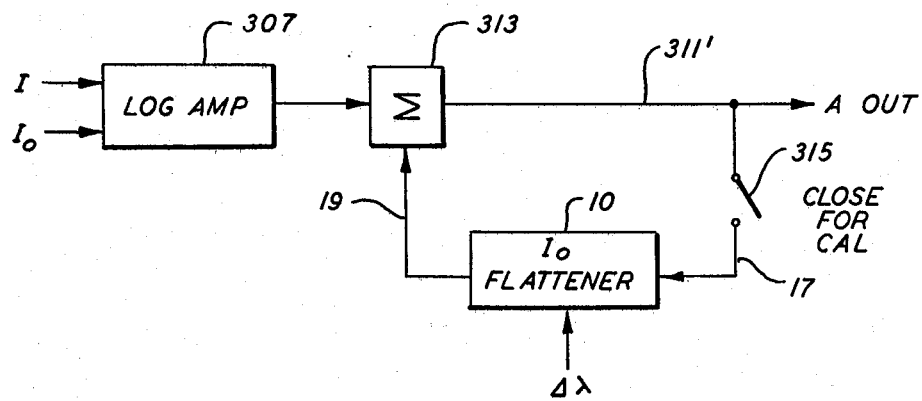

FIGS. 6*a* and 6*b* illustrate two manners of obtaining the necessary feedback in a closed loop for calibrating a dual beam spectrophotometer using the system of the present invention. Two basic types of spectrophotometers are known. In the type shown on FIG. 6*a*, the intensity signals I and $I_0$ are provided to a divider 301 where their ratio is determined. Such a system includes an auto zero input reference voltage 303 which is provided to a multiplier 305 the output of which is the input to a logrithmic amplifier 307 which converts the multiplied ratio value, which is a value proportional to transmittance, into an absorbance value. Thus, this system includes a transmittance output on line 309 and an absorbance output on line 311. On this figure the system of the present invention is shown as a block 10 labelled $I_0$ flattener. The output of this block 10, i.e. the output of the present system on line 19 is provided to a summing amplifier 313 where it is summed with the auto zero reference voltage on line 303 and the output then provided as the input to the multiplier 305. This connection is always maintained. A switch 315 which is closed during calibration couples the output on line 311 to the line 17 of FIG. 1 so that it may be digitized and processed.

In another type of instrument, the I and $I_0$ signals are fed directly into a logrithmic amplifier 307' the output of which is a raw absorbance signal. In this embodiment, a summing amplifier 313 is provided at which the output on line 19 is summed with the output of the log amplifier. The final absorbance output is provided on line 311. Again, the switch 315 is provided to coupled the line 311' to the line 17 at the input to the $I_0$ flattener system of the present invention. In the embodiment of FIG. 6*a*, the correction is applied to the multiplier 305 in such a manner as to make the output on line 311 become 0. In the embodiment of FIG. 6*a* the addition to the absorbance value is such as to make the output 0. It should be noted that the sence of these corrections is opposite and the polarity of the output signal on line 19 of FIG. 1 or FIGS. 6*a* and 6*b* will have to be reversed depending on which type of instrument it is used with. Of course, the same is true in any other device which might be used. The polarity of the output signal in each case must be selected so as to give the proper type of correction.

Additional Design Considerations

In implementing the present invention TMS 3133 MOS shift registers or their equivalent may be used as the shift registers 21*a*. The remainder of the logic can be implemented using 7400 series logic. For example, the decade counter 152 may be a 7490 module, the decoder a 7442, the D flipflops in the shift registers 21*b* for the C, C' and D, D' bits a 74175 unit to get a single reset with the remainder of the flipflops 7474 dual units. One shot 120 may be a 9602 module.

Various modifications of the present invention are possible. In particular, it is possible to vary the size of the memory. In general terms it can be stated that the number of bits needed in storage is proportional to the product of the following three things: (1) the total range of the independent variable, e.g., wavelength over which correction is applied; (2) the rate at which the error, e.g. the uncorrected baseline changes with the independent variable e.g. wavelength; and (3) the number of ordinate steps which would equal the maximum possible error, e.g. in the case of the spectrophotometer 100%T. It will be recognized that additional memory chips such as chip 21*a* can easily be added to the circuit and that very little additional space and no other circuit changes would be required. Of course, in any individual system only a practical amount of memory expansion should be carried out depending on the way the system operates. For example, in a typical dual beam spectrophotometer chopping occurs and there is really no need to correct more than once per chop during the calibration run.

In expanding the memory, coding schemes different than that disclosed herein can also be considered. The present system stores correction data two bits at a time and one-fourth of the possible combinations is reserved for the marker. On the other hand, if correction bits were stored four at a time, only one-sixteenth of the possible combinations would be needed for a marker. Of course, if expansion of the memory other than a simple lengthing of the shift registers is carried out, additional complexity in the input and output gating will arise. In other words, instead of quantitizing the error into three possibilities, it would become necessary to quantitize the error, for example, into five or more possibilities.

There is also a limitation on memory size in conjunction with the frequency of the oscillator and the maximum frequency which the circuits can tolerate. It is, of course, necessary that the shift registers be able to carry out a complete circulation for each step of the independent variable. This means that with larger memories, or for that matter even with the memory presently used, it is important that the stepping rate of the instrument does not exceed the rate at which a circulation per step can be accomplished.

With respect to the output filtering which is a portion of the digital to analog conversion of the present invention, it should be noted that too much filtering will introduce sufficient lag to effect the closed loop operation of the circuit during calibration permitting correction overshoots which would lead to a type of instability. The lowest cutoff frequency is believed to be roughly equal to the frequency at which increments of independent variable are passed when corrections are being made. Furthermore, with this scheme there is a certain amount of stepping in the output which occurs despite smoothing by the filter. Another possible modification is the uncovering of a step gradually in, for exmaple, ten smaller steps. Since the basic frequency used in the oscillator 150 is divided by ten by the decade counter 152 such a feature could be incorporated without substantial difficulty.

With respect to the integrator 194 on the input circuit, it will be recognized that the integration depends on a fixed time period between steps. Because of this, the time constant of the integrator will be proper only for a given calibration speed. If it is desired to calibrate at different speeds, then means must be provided to change the integrator time constant.

These and other modifications may be made without departing from the spirit of the invention which is intended to be limited solely by appended claims.

I claim:

1. In a device having an independent variable which can be changed at least between a first lower limit and a second upper limit the device having an error which is a function of the value of the independent variable, a method of correcting the error comprising the steps of:
   a. storing, in a plurality of adjacent data storage positions, a correction value for each of a plurality of increments of the independent variable between said first and second limits and also storing a location marker which is different from any correction value;
   b. initializing the device at said first limit;
   c. while said device is initialized at said first limit locating said location marker so as to be adjacent the correction value for the first increment of said independent variable from said first limit toward said second limit; and
   d. upon movement of said independent variable through an increment, moving said location marker so as to be adjacent the stored correction value for the next increment; and
   e. reading the error correction value corresponding to the incremental position of the device and providing said value as a correction to said device.

2. The method of claim 1 wherein said step of storing correction value comprises storing for each increment of said independent variable only the incremental change in correction value between that increment and the adjacent increment and further including the step of reading and integrating all correction values between the position corresponding to said first increment and said location and providing the result to said device.

3. The method of claim 2 and further including the step of zeroing said system so as to have zero error at said first limit.

4. The method of claim 2 and further including the step of storing an index marker in a position adjacent the correction value for said first increment and continuously circulating said data at a rate much greater than the rate of said independent variable, detecting the passage of said index marker and said location marker at a fixed point each circulation cycle and reading all correction values stored between said index marker and said reference marker each cycle, filtering said read values and providing the filtered result to said device so as to provide an average value corresponding to the proper correction for the position of said location marker.

5. The method of claim 4 wherein said correction values comprise binary data.

6. The method of claim 5 wherein each storage position comprises two bits, data stored in a first bit indicating an incremental positive change and data stored in a second bit indicating an incremental negative change and wherein said index marker comprises the storage of two indentical binary states in two adjacent storage positions and said reference marker comprises the storage of two identical states in one storage position.

7. The method of claim 1 and further including storing said correction values by steps comprising:
   a. clearing all data which was previously stored;
   b. positioning said location marker so as to be at the data position corresponding to said first limit;
   c. moving said device to said first limit;
   d. moving said device through the increments of said independent variable and moving said location marker with each step of said independent variable;
   e. measuring and digitizing the error in said system at each increment of said independent variable; and
   f. storing correction values corresponding to said digitized error at a position adjacent said location marker at each increment.

8. In an analytical instrument adapted to step through incremental changes in an independent variable between a first limit and a second limit said instrument having an error which is dependent on the independent variable, a method of providing a correction to said instrument as a function of said independent variable comprising the steps of:
   a. storing in a circulating binary shift register in adjacent storage positions thereof an incremental correction value for each independent variable step;
   b. also storing in said shift register next to the storage position corresponding to the first step an index marker having a bit configuration which is different from the configuration of any correction value;

c. also storing in said shift register a location marker having a bit configuration different from said index marker and from any correction value;

d. clocking said shift register at a rate much greater than the rate of said independent variable;

e. initializing said instrument at said first limit and moving said location marker so as to be in a position adjacent the stored correction value for the first step of the instrument;

f. moving said location marker a distance of one storage position away from said index marker for each forward step of said instrument and one storage position toward said index marker for each backward step of said instrument; and g. providing as a correction output to said instrument the average of the correction values stored between said index marker and said location marker.

9. The method of claim 8 and further including the step of storing correction data in said shift register by steps comprising:

a. initializing the instrument so as to be at said first limit;

b. locating said reference marker so as to be adjacent the storage location corresponding to the first step of said instrument;

c. stepping said instrument independent variable from said first to said second limit and moving said location marker with each step of said instrument; and d. measuring the error at each step of said instrument, digitizing said error and storing said error in said shift register adjacent said location marker.

10. The method according to claim 9 wherein each storage position comprises at least one binary bit and wherein said step of digitizing comprises: establishing a predetermined error value which will correspond to a binary 1; integrating the error measured at said instrument; comparing the integral with said predetermined value, and when said error reaches said predetermined value, storing a binary 1 as a correction and resetting said integrator.

11. The method of claim 10 wherein each storage position comprises two binary bits and wherein positive and negative incremental errors are stored in said respective bits and said step of comparison comprises comparing said integrated error with a positive value and a negative value and storing a binary 1 in one of said two bits when said positive value is detected and in the other of said bits when said negative value is detected.

12. The method of claim 8 wherein said instrument is a dual beam spectrophotometer and said error is an error in the ratio $I/I_0$.

13. The method according to claim 8 wherein said step of providing an output comprises reading all data stored between said index marker and said location marker each cycle of the shift register, and sequentially passing said data through a low pass filter to obtain said average.

14. In a system in which an error which is a function of an independent variable exists and wherein corrections for said error are stored for each of a plurality of steps of the independent variable, between a first and a second limit, an improved method of providing error correction to the system comprising: storing the error corrections as incremental corrections in adjacent storage locations in a memory device and providing as a correction output to the system the average of all stored error corrections between the first limit of the independent variable and the storage location corresponding to the actual position of the independent variable.

15. In a device having an independent variable which can be changed at least between a first lower limit and a second upper limit the device having an error which is a function of the value of the independent variable, apparatus for correcting the error comprising:

a. means having a plurality of data storage positions for storing, in adjacent data storage positions thereof, a correction value for each of plurality of increments of the independent variable between said first and second limit and also storing a location marker which is different from any correction value;

b. means for initializing the device at said first limit;

c. means for positioning said location marker so as to be adjacent the correction value for the first increment of said independent variable from said first limit toward said second limit while said device is initialized at said first limit;

d. means for moving said location marker so as to be adjacent the stored correction value for the next increment upon movement of said independent variable through an increment; and e. means for reading the correction value corresponding to the incremental positon of said device and providing said value as a correction to said device.

16. Apparatus according to claim 15 wherein said correction values comprises, for each increment of said independent variable, only the incremental change in correction value between that increment and the adjacent increment and further including means for integrating the correction data before providng it to said device.

17. Apparatus according to claim 16 and further including an index marker stored in a position adjacent the correction value for said first increment on the side opposite said location marker, means for continuously circulating the data in said means for storing at a rate much greater than the rate of change of said independent variable, means for detecting the passage of said index marker and said location marker at a fixed point in said means for storing during each cycle, means enabled by said means for detecting, for providing as an output all correction values stored between said index marker and said reference marker and means for filtering said output before providiing it to said device so as to provide an average value corresponding to the proper correction for the position of said location marker.

18. The apparatus according to claim 17 wherein said correction values, said reference marker and said index marker comprise binary data and said means for storing comprises a shift register.

19. Apparatus according to claim 18 wherein each storage position comprises two bits in said shift register, data stored in a first bit indicating an incremental positive change and data stored in a second bit indicating an incremental negative change and wherein said index marker comprises the storage of two identical binary states in two adjacent storage positions and said reference marker comprises the storage of two identical states in one storage position.

20. Apparatus according to claim 19 and further including means for entering said correction values into said shift register comprising:

a. means for initializing said apparatus so as to provide in said shift register said index marker and said location marker separated from each other by one data storage position;

b. means obtaining an input from said device for measuring and digitizing the error in said device as said independent variable is moved from its first limit to its second limit, said means for moving said location marker moving said location marker along therewith; and c. means for storing the output of said means for measuring and digitizing in said shift register at a position adjacent said location marker for each increment.

21. Apparatus according to claim 20 wherein said means for measuring and digitizing comprise:

a. an integrator having an input coupled to the error output of said device;

b. a first comparator having the output of said integrator as an input and providing an output when its input exceeds a predetermined positive value;

c. a second comparator having the output of said integrator as an input and arranged to provide an output when its input exceeds a predetermined negative value;

d. first and second gating means having as respective inputs the outputs of said first and second comparators;

e. means to enable said first and second gating means during a period when storage of data is desired and by said means for detecting the passage of said location marker at said fixed location, the outputs of said first and second gating means coupled to respectively set and reset the bits in the storage position adjacent said fixed point in said shift register.

22. Apparatus according to claim 21 wherein said means for providing an output comprise:

a. third and fourth gating means obtaining inputs respectively from the first and second bits of the storage location in said shift register adjacent said fixed point; and b. a latch having a set input coupled to said means for detecting said index marker and a reset input coupled to said means for detecting said location marker, the output of said latch coupled as an enabling input to said third and fourth gating means the output of said gating means coupled to said means for filtering;

23. Apparatus according to claim 22 wherein said filtering means comprise:

a. a differential amplifier having as inputs respectively the outputs of said third and foruth gating means; and b. a low pass filter coupled to the output of said amplifier, the output of said low pass filter being coupled as the correction input to said device.

24. Apparatus according to claim 23 wherein said device provides an output indicative of its direction of movement forward or backward and wherein said means for moving said location marker comprise means to cause said location marker to jump over one storage position in a direction toward said index marker when said direction signal from said device indicates a backward direction and to jump over one storage position in a direction away from said index marker when said direction signal from said device indicates forward motion.

25. Apparatus according to claim 24 wherein said means for circulating data in said shift register comprises a clock having at least a first and a second output spaced in time with respect to each other and wherein said shift register comprises:

a. a first shift register section having at least four stages;

b. a second shift register section having a plurality of stages such that the number of stages in said first and second sections are at least equal to the number of incremental steps of said device over which error correction is required, an output of the last stage of said first section coupled as an input to the first stage of said second section and an output of the last stage of said second section coupled as an input to the first stage of said first section;

c. third and fourth shift register sections identical respectively to said first and second shift register sections and coupled to each other in the same manner as said first and second sections, corresponding positions in said first and second sections and said third and fourth sections constituting the data position of two bits each, said first and third sections being coupled to be clocked by said first clock signal and said second and fourth sections by said second clock signal; wherein;

d. said means for detecting said index marker are coupled to detect said index marker in the third and fourth stages of said first and third shift registers; said means to detect said location marker are coupled to detect said location marker in said third stage of said first and third shift registers; further including;

e. further means detecting said location marker in said second location of said first and third shift register sections;

f. said third and fourth gating means having their inputs coupled to the output of said third stage of said first and second shift registers respectively to the reset and preset inputs of said first and second stages of said first and second shift register; and wherein said means for moving comprise;

g. means to disable the coupling of said fourth stage of said first and third sections to said second and fourth respectively and to enable instead the coupling of said third stages of said first and second shift register sections to said second and fourth respectively in response to a jump command;

h. means for generating a jump command in response to an output from said means for detecting said location marker, an output indicative of a step by said device and an output indicating forward direction from said device and also generating a jump command upon an output from said further means for detecting, said step indication from said device and a reverse output signal from said device; and i. means for suppressing the clock pulse supplied to the fourth stage of said first and second shift register which occurs immediately after transfer of data from said third stage of said first and third sections to the first stage of said second and fourth stages.

26. Apparatus according to claim 24 wherein said means for initializing said apparatus so as to provide said index and location marker separated from each other by one data storage position comprise:

a. means for providing an output signal lasting for at least the time to circulate all data through both said shift register sections once, said signal coupled to set the fourth stages of said first and third shift register sections for as long as said signal is present whereby digital ones will be loaded into each stage of all said shift register sections;

b. means to detect the presence of digital ones in said first, second and third stages of said first and third shift register sections and to provide a signal to reset the fourth stages of said first and third shift register sections in response thereto whereby said shift register section will fill with zeros until a pair of zeros reaches the first stages of said first and third shift register sections;

c. means to detect the condition of ones in each of the second, third and fourth stages in said first and third shift register sections and zeros in the first stages of said first and third shift register sections and to provide an output to reset the second stages of said first and third shift register sections and to set the fourth stages of said first and third shift register sections.

27. Apparatus according to claim 26 wherein the complementary outputs of the third and fourth stages of said first and third shift register sections are coupled as the data inputs to said second and fourth shift register sections respectively and wherein the complementary outputs of said first stage of said first and third shift register sections are coupled as the data inputs to the second stages of said first and third shift register sections respectively whereby the data ones will exist as data zeros in said second and fourth shift register sections and in the first stages of said first and third shift register sections and wherein said means to reset said second stages and set said first stages comprises means to reset both said first and second stages thereby permitting a common reset line to be used for all of said stages.

* * * * *

UNITED STATES PATENT AND TRADEMARK OFFICE
CERTIFICATE OF CORRECTION

PATENT NO. : 4,084,248
DATED : April 11, 1978
INVENTOR(S) : Larkin B. Scott

It is certified that error appears in the above-identified patent and that said Letters Patent are hereby corrected as shown below:

Column 1, line 56, change "erronous" to --erroneous --.

Column 4, line 61, change "Paty to --path --.

Column 5, line 63, change "instruemnts" to -- instruments --.

Column 6, line 8, change "circultates" to -- circulates --.

Column 6, line 60 omit "is".

Column 8, line 47, change "initizlized," to -- initialized,--.

Column 8, line 24, change "Swith" to --switch --.

Column 12, line 20, before "other" add --the --.

Column 12, line 20, change "direcation" to -- direction--.

UNITED STATES PATENT AND TRADEMARK OFFICE
CERTIFICATE OF CORRECTION

PATENT NO. : 4,084,248

DATED : April 11, 1978

INVENTOR(S) : Larkin B. Scott

It is certified that error appears in the above-identified patent and that said Letters Patent are hereby corrected as shown below:

Column 17, line 41, change "'$_1$" to --$\emptyset_1$--.

Column 18, line 22, change "coupled" to -- couple--.

Colum 19, line 9, change "lengthing" to -- lengthening --.

Column 19, line 37, change "exmaple," to -- example --.

Column 20, line 40, change "indentical" to -- identical --.

Column 23, line 51, change "foruth" to -- fourth --.

Column 4, line 67, change "depandent" to --dependent --.

Signed and Sealed this

Twelfth Day of December 1978

[SEAL]

Attest:

RUTH C. MASON
Attesting Officer

DONALD W. BANNER
Commissioner of Patents and Trademarks